US011849428B2

(12) United States Patent
Vivanco et al.

(10) Patent No.: US 11,849,428 B2
(45) Date of Patent: Dec. 19, 2023

(54) SYSTEM AND METHODS FOR COVERAGE EXTENSION BASED ON CARRIER AGGREGATION

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Technical Services Company, Inc., Vienna, VA (US); AT&T Intellectual Property I, L.P., Atlanta, GA (US)

( * ) Notice: Subject to any disclaimer, the term of this patent is extended or adjusted under 35 U.S.C. 154(b) by 47 days.

(21) Appl. No.: 17/352,541

(22) Filed: Jun. 21, 2021

(65) Prior Publication Data
US 2022/0408411 A1     Dec. 22, 2022

(51) Int. Cl.
*H04W 72/02*     (2009.01)
*H04W 52/02*     (2009.01)
*H04W 8/24*     (2009.01)
*H04W 72/0453*     (2023.01)

(52) U.S. Cl.
CPC ............. *H04W 72/02* (2013.01); *H04W 8/24* (2013.01); *H04W 52/0261* (2013.01); *H04W 72/0453* (2013.01)

(58) Field of Classification Search
CPC ... H04W 72/02; H04W 8/24; H04W 52/0261; H04W 72/0453
See application file for complete search history.

(56) References Cited

U.S. PATENT DOCUMENTS

| 8,625,415 | B2 | 1/2014 | Sebire et al. |
| 10,045,359 | B1 * | 8/2018 | Sitaram ................. H04L 5/0098 |
| 10,856,175 | B1 * | 12/2020 | Broyles ............. H04W 72/0486 |
| 11,026,131 | B1 * | 6/2021 | Marupaduga ......... H04W 36/22 |
| 2015/0003402 | A1 * | 1/2015 | Chang ..................... H04L 5/001 370/329 |

(Continued)

FOREIGN PATENT DOCUMENTS

CN     106792932 A   *   5/2017

OTHER PUBLICATIONS

Wikipedia, Carrier aggregation, May 18, 2021, pp. 1-3.

*Primary Examiner* — Yu-Wen Chang
(74) *Attorney, Agent, or Firm* — Guntin & Gust, PLC; Andrew Gust

(57) ABSTRACT

Aspects of the subject disclosure may include, for example, collecting information about capabilities of a user equipment (UE) device operating on a radio communication network, collecting information about requirements and status of the UE device, collecting information about the radio communication network, selecting a carrier aggregation arrangement for the UE device based on at least the information about capabilities and the information about requirements and status, forming a selected carrier aggregation arrangement, and configuring network nodes of the radio communication network according to the selected carrier aggregation arrangement. Other embodiments are disclosed.

20 Claims, 9 Drawing Sheets

(56) References Cited

U.S. PATENT DOCUMENTS

| | | | |
|---|---|---|---|
| 2016/0100447 A1* | 4/2016 | Chen | H04W 74/004 |
| | | | 370/329 |
| 2018/0084549 A1* | 3/2018 | Liu | H04L 5/001 |
| 2018/0176966 A1* | 6/2018 | Cui | H04W 8/20 |
| 2020/0187212 A1* | 6/2020 | Bellamkonda | H04L 5/0098 |
| 2020/0235871 A1* | 7/2020 | Kim | H04W 72/04 |
| 2020/0275329 A1* | 8/2020 | Damerla | H04W 36/00835 |
| 2021/0037426 A1* | 2/2021 | Zhu | H04W 28/16 |
| 2021/0050968 A1* | 2/2021 | Yi | H04L 5/0032 |
| 2021/0144601 A1* | 5/2021 | Kazmi | H04W 36/0088 |
| 2022/0077896 A1* | 3/2022 | Jung | H04B 7/024 |
| 2022/0117026 A1* | 4/2022 | Kwok | H04W 52/40 |
| 2022/0182997 A1* | 6/2022 | Feki | H04W 52/0277 |
| 2022/0416987 A1* | 12/2022 | Takeda | H04L 5/001 |

\* cited by examiner

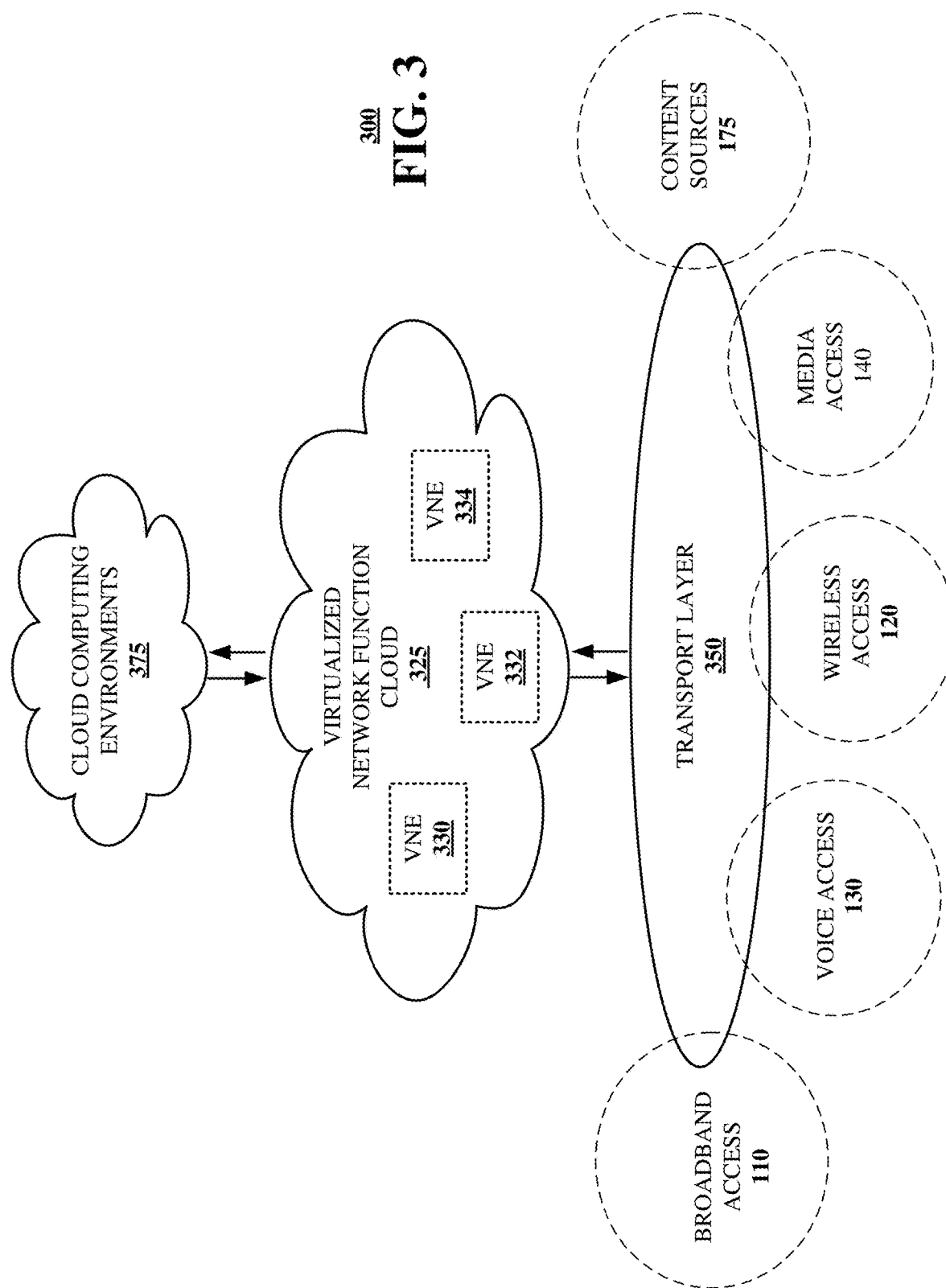

SYSTEM AND METHODS FOR COVERAGE EXTENSION BASED ON CARRIER AGGREGATION

FIELD OF THE DISCLOSURE

The subject disclosure relates to a system and method for coverage extension in a wireless communication system based on carrier aggregation.

BACKGROUND

Radio communication networks provide for aggregating more than one carrier from base stations to user equipment.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for selecting and configuring carrier aggregation in a wireless communication system. Carrier aggregation may be based on demand from user equipment (UE) devices and requirements. The carrier aggregation can be configured to increase network communication throughput or to expand coverage. An algorithm collects UE device capabilities and requirements along with network information to decide which carrier aggregation arrangement to use. Other embodiments are described in the subject disclosure.

One or more aspects of the subject disclosure include collecting information about capabilities of a user equipment (UE) device operating on a radio communication network, collecting information about requirements and status of the UE device, collecting information about the radio communication network, selecting a carrier aggregation arrangement for the UE device based on at least the information about capabilities and the information about requirements and status, forming a selected carrier aggregation arrangement, and configuring network nodes of the radio communication network according to the selected carrier aggregation arrangement.

One or more aspects of the subject disclosure include receiving, from a user equipment (UE) device, information about capabilities of the UE device operating on a radio communication network, wherein the receiving comprises receiving information about carrier components supported by the UE device for carrier aggregation and receiving information about current requirements and information about a current operational status of the UE device. Other aspects of the subject disclosure include selecting a carrier aggregation arrangement, wherein the selecting is based on the information about capabilities of the UE device and the information about current requirements and the information about a current operational status of the UE device, and configuring a plurality of network nodes of the radio communication network according to the selected carrier aggregation arrangement to initiate carrier aggregation between the radio communication network and the UE device.

One or more aspects of the subject disclosure include receiving capabilities information of a user equipment (UE) device operating on a radio communication network, receiving requirements information of the UE device, and receiving network topology information about devices of the radio communication network. Other aspects of the subject disclosure include matching the capabilities information and the requirements information with the network topology information, producing aggregation option information, selecting a carrier aggregation arrangement for the UE device based on at least the aggregation option information, and configuring a plurality of network nodes of the radio communication network according to the carrier aggregation arrangement.

Figure 1:
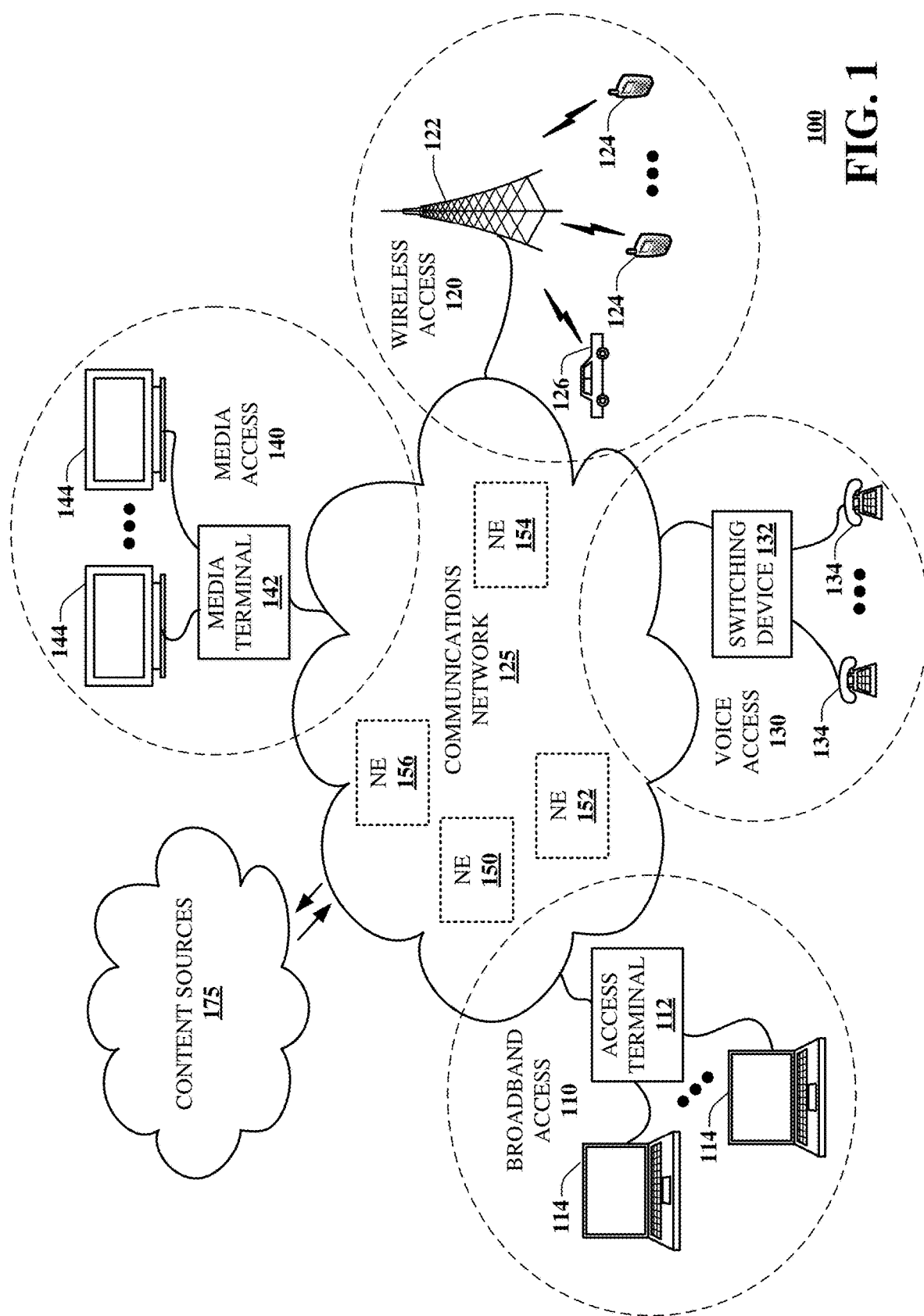
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part collecting information about capabilities and requirements of a user equipment device on a mobility network, collecting network information, and selecting and configuring carrier aggregation based on the capabilities and requirements of the user equipment. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
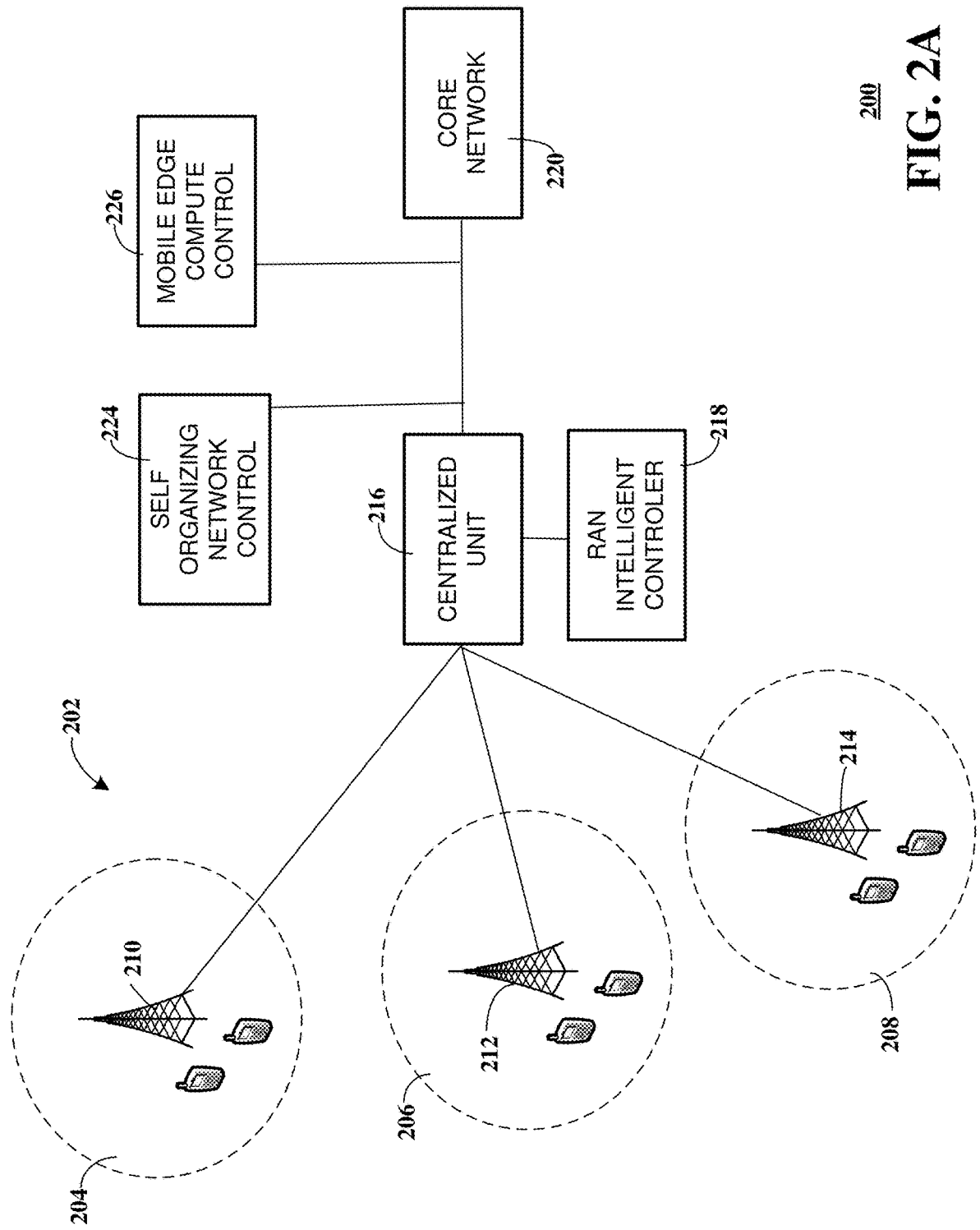
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a radio communications network 200 functioning within the communication network 125 of FIG. 1 in accordance with various aspects described herein. The radio communication network 200 is an exemplary embodiment of a network for radio communication among fixed parts such as base stations or access points and portable parts such as mobile devices.

Embodiments may have particular application in a radio communication system such as a cellular communication system. Such a system generally includes a plurality of cells in which each respective cell provides telecommunication service to a respective geographic area. In FIG. 1, wireless access 120 is an example of providing radio communication to a plurality of mobile devices 124 and vehicle 126 via base station or access point 122, The base station or wireless access 120 provides telecommunication service to compatible equipment in the geographic area served by the base station or wireless access 120. A cellular communication system may include a plurality of contiguous cells, each cell including a base station or access point 122 serving an assigned area. The base station or access point 122 provides radio communication services to mobile phones other devices in a cell. Such a cellular communication system may be referred to as a mobile communication system. As a mobile phone or other device moves from a first cell to an adjacent cell, radio communication with a particular base station or access point 122 is handed off to a subsequent base station or access point serving the adjacent cell in a process known as handoff or handover.

The radio communication system may be a radio access network (RAN) which provides radio communication services to user equipment (UE) devices within a geographic area. The RAN may include a plurality of access points or base stations. The access points or base stations may be referred to as a Node B or evolved Node B or eNodeB or other names. The RAN may be in communication with a core network (CN) for connection to other communication services and for managing tasks such as UE registration and handoff. Each RAN operates according to a radio access technology. Examples of such radio access technologies include fifth generation cellular (5G), fourth generation cellular (4G), Long-term Evolution (LTE) or third generation cellular (3G), Universal Mobile Telecommunication System (UMTS), Evolved Universal Mobile Telecommunications System Terrestrial Radio Access Network (E-UTRAN) and others as well. Other examples of such radio access technologies include technologies and protocols to be developed in the future. The UE operates according to complementary radio access technology. The UE may be referred to as a mobile station (MS), portable part (PP) or new radio (NR), for example, The radio communication network 200 in the exemplary embodiment of FIG. 2A includes three cells including a first cell 204, a second cell 206 and a third cell 208, a centralized unit 216, a radio access network (RAN) intelligent controller 218, and a core network 220. The first cell 204 is served by a first base station or distributed unit (DU) 210. The second cell 206 is served by a base station or second distributed unit (DU) 212. The third cell 208 is served by a third base station or distributed unit (DU) 214. The radio communication network 200 further includes a centralized unit (CU) 216 and a radio access network (RAN) intelligent controller (RIC) 218. The CU 216 is in data communication with the core network 220. The three cells including the first cell 204, the second cell 206 and the third cell 208 together form a cluster 202. Each respective cell may be termed a network node. Each network node provides radio access to remaining portions of the network such as the core network 220.

In the exemplary embodiment of FIG. 2A, the cluster 202 includes three cells. Particular embodiments may include any suitable number of cells in cluster 202, depending on network requirements, traffic levels and other factors. In typical embodiment, the cluster 202 may include dozens or hundreds of cells. Also, the number of cells in the cluster 202 may vary over time as network usage and build-out change and develop. For example, if the first cell 204 is divided into multiple smaller cells to manage increasing traffic levels, the smaller cells may be added to the cluster 202, increasing the number of cells in the cluster 202.

The radio communication network 200 implements a RAN using radio access technology. In the illustrated example, Third Generation Partnership Project (3GPP) NR 5G cellular network technology is implemented in the radio communication network 200. However, any suitable radio access technology now known or later developed, such as LTE or LTE-Advanced, may be selected and implemented. As noted, the cluster 202 may include any suitable number of cells and it is anticipated that the cluster 202 will include a large number of cells, such as 100 cells served by 100 respective DUs.

The DUs 210, 212, 214 are logical network nodes that perform a subset of eNodeB functions. Each respective DU provides mobile radio communication service to user equipment (UE) devices located in the respective cell served by the respective DU. In the example of FIG. 2A, each respective DU 210, 212, 214 is one DU of the cluster 202 of DUs serving respective geographically contiguous areas defined by the respective cells including first cell 204, second cell 206, and third cell 208 and operating substantially synchronously so that uplink transmissions are substantially synchronous among the DUs 210, 212, 214 of the cluster 202 and downlink transmissions are substantially synchronous among the DUs 210, 212, 214 of the cluster 202 to limit inter-cell interference.

Each DU of the radio communication network 200, including first DU 210, second DU 212 and third DU 214, is in communication with the CU 216. In some embodiments, each respective DU is a remote radio head (RRH) or remote radio unit (RRU), providing radio frequency (RF) communication with UE in each respective cell. Each DU, including first DU 210, second DU 212 and third DU 214, may communicate with the CU 216 using fiber optic cable or other means of data communication.

The CU 216 provides control of the respective DUs in the radio communication network 200. The CU 216 is a logical network node that performs a subset of eNodeB functions. Such functions may include transfer of user data, mobility control, radio access network sharing, positioning, session management, for example. The CU 216 provides baseband central control. The CU 216 generally controls the respective DUs. The split of functionality between the CU 216 and DUs such as DU 210, DU 212, and DU 214, is established by the network operator of the radio communication network 200.

The CU 216 operates in conjunction with the RIC 218. The RIC 218 is a network node that controls certain aspects of the radio communication network 200. The RIC 218 provides access to some functions of the radio communication network 200. The RIC 218 may control operation of the CU 216 and respective DUs in the radio communication network 200.

In the illustrated embodiment, the radio communication network 200 includes a self-organizing network control module 224 and a mobile edge compute control 226. The self-organizing network control module 224 may control implementation of a self-organizing network in the radio communication network 200. A self-organizing network (SON) may include automation technology to make the planning, configuration, management, optimization and healing of mobile radio access networks simpler and faster to achieve. In a self-organizing network, newly added base stations may be self-configured. Currently operating base stations will self-optimize. The self-organizing operation may be coordinated or controlled by the self-organizing network control module 224. The self-organizing network control module 224 may be in communication with other elements of the radio communication network 200. The self-organizing network control module 224 collects network information and performs suitable analysis. Mobile edge computing, or multi-access edge computer (MEC) enables cloud computing capabilities at the edge of a cellular network such as the network formed by the cluster 202. By running applications and performing related processing tasks closer to the cellular customer, network congestion may be reduced and applications may perform better. MEC technology may be implemented at the cellular base stations or other edge nodes, and may enable flexible and rapid deployment of new applications and services for customers.

Communication between a UE device and a base station is conducted using carrier signals of specified frequency. Each base station may use multiple carriers or bands of frequencies to communicate with multiple UE devices in a cell. Each carrier may be referred to as a channel and may have individual channel characteristics besides frequency.

In some cases, multiple carriers may be combined or aggregated for communication between a UE device and a base station. Carrier aggregation (CA) is used in some radio access technologies such as LTE-Advanced in order to increase the communication bandwidth. Increasing bandwidth increases the bitrate of communication between a UE device and a base station or eNodeB. In LTE Advanced systems, carrier aggregation (CA) is a technique used to enable the very high data rates of 4G cellular communication to be achieved. By combining more than one carrier together, either in the same or different bands, it is possible to increase the bandwidth available and, in this way, increase the capacity of the link between the UE device and the base station. Further, CA enables use of available radio spectrum to be maximized. Often, frequency bands of available spectrum are relatively small as the availability of spectrum is limited. Spectrum assignment may be made by government or other entities and may make available only small bands. Carrier aggregation seeks to be able to utilize both small bands and large bands more effectively and efficiently.

Carrier aggregation may be used in both Frequency Division Duplex (FDD) and Time Division Duplex (TDD) modes. In carrier aggregation, multiple frequency blocks, called component carriers, are assigned to the same user or UE device. 3GPP release-10 supports up to two Component Carriers (CCs) in a downlink (DL) and one CC in an uplink (UL). The maximum possible data rate per user is increased as more frequency blocks are assigned to a user. 3GPP release 12 allows 3 CCs in the downlink and 2 CCs in the uplink. Other systems and implementations may specify other arrangements. CA allows mobile network operators to combine a number of separate LTE carriers. This enables the network operators to increase peak user data rates and overall capacity of their networks and to exploit fragmented spectrum allocations. Carrier aggregation can be used to combine carriers whether they are contiguous or even in the same frequency band.

Carrier aggregation can generally be used to produce two beneficial effects, throughput increase or coverage extension. Throughput refers to the actual amount of data or information that is successfully communicated over a communication link, such as between a UE device and the network. Throughput may be measured in Mbps or similar units. Coverage extension refers to an increase in the geographical area to which a base station provides radio communication services to UE devices.

In general, carrier aggregation is used by wireless operators to increase UE device throughput. Carrier aggregation is usually configured with collocated cells operating in the same frequency band, which provide similar coverage. Conversely, carrier aggregation can also be configured on non-collocated cells with partial coverage overlap. This technique may be used to extend coverage.

When carrier aggregation in an LTE or other network is enabled, it is necessary to be able to schedule the data across the carriers and to inform the terminal or user equipment of the downlink control information (DCI) rates for the different component carriers. Data can be schedule to the UE using either cross-carrier scheduling or same carrier scheduling. In same carrier scheduling, downlink scheduling assignments are achieved on a per carrier basis, where they are valid for the component carrier on which they were transmitted. In cross-carrier scheduling, the physical downlink shared channel (PDSCH) on the downlink or the physical uplink shared channel (PUSCH) on the uplink is transmitted on an associated component carrier other than the physical downlink control channel (PDCCH). The carrier indicator in the PDCCH provides the information about the component carrier used for the PDSCH or PUSCH. This information is within the downlink control information and is called Carrier Indicator Field (CIF).

It is necessary to be able to indicate to which component carrier in any aggregation scheme a grant relates. To facilitate this, component carriers are numbered. The primary component carrier is numbered zero, for all instances, and the different secondary component carriers are assigned a unique number through the UE specific radio resource control (RRC) signaling. This means that even if the terminal or user equipment and the base station, eNodeB may have different understandings of the component carrier numbering during reconfiguration, transmissions on the primary component carrier can be scheduled.

Carrier aggregation is triggered at the UE level. When the serving cell does not have enough resources to satisfy UE demand, a memory storage location UE-Buffer at the serving cell will begin to fill with data and may exceed a predefined threshold value (which may be referred to as CA.BUFFER.THRES in some embodiments). If this happens, the serving cell will trigger carrier aggregation for this UE.

The serving carrier where the UE device gets its system information may be referred to as the primary cell (PCell). Every other configured carrier may be referred to as a secondary cell (SCell). In embodiments, the PCell is responsible for cross-carrier scheduling of the secondary cells but not vice-versa. Further, in embodiments, the PCell cannot be cross scheduled. It is always scheduled through its own physical downlink control channel (PDCCH).

Mobility on a CA-Coverage Extension scheme relies on re-selection of a primary cell (PCell) serving the UE device. Mobility on a CA-Throughput Increase scheme relies on handover procedure. A handover procedure requires more UE battery resources and network signaling overhead than PCell re-selection. Moreover, a CA-Coverage Extension scheme will minimize likelihood of call-drop at cell edge, since radio frequency (RF) resources are aggregated at the cell-edge. There may be cases in which CA-Coverage Extension is more useful for some UE devices than CA-Throughput Increase. Some UE devices may be limited by the available CA frequency combination and the maximum number of component carriers supported. 3GPP Standards do not offer recommendations for selecting and configuring CA, including CA to increase throughput or CA to expand coverage, based on UE device demand and requirements.

When LTE carrier aggregation is enabled, it is necessary to be able to schedule the data across the carriers and to inform the terminal or UE device of the downlink control indicator (DCI) rates for the different component carriers. Data can be scheduled to the UE device using either cross carrier scheduling or same carrier scheduling. In same-carrier scheduling, downlink scheduling assignments are achieved on a per-carrier basis, where they are valid for the component carrier (CC) on which they were transmitted. In cross carrier scheduling, the physical downlink shared channel (PDSCH) on the downlink or the physical uplink shared channel (PUSCH) on the uplink is transmitted on an associate component carrier other than the PDCCH. The carrier indicator in the PDCCH provides the information about the component carrier used for the PDSCH or PUSCH. This information is within the downlink control information and is called the Carrier Indicator Field (CIF).

Figure 2B:
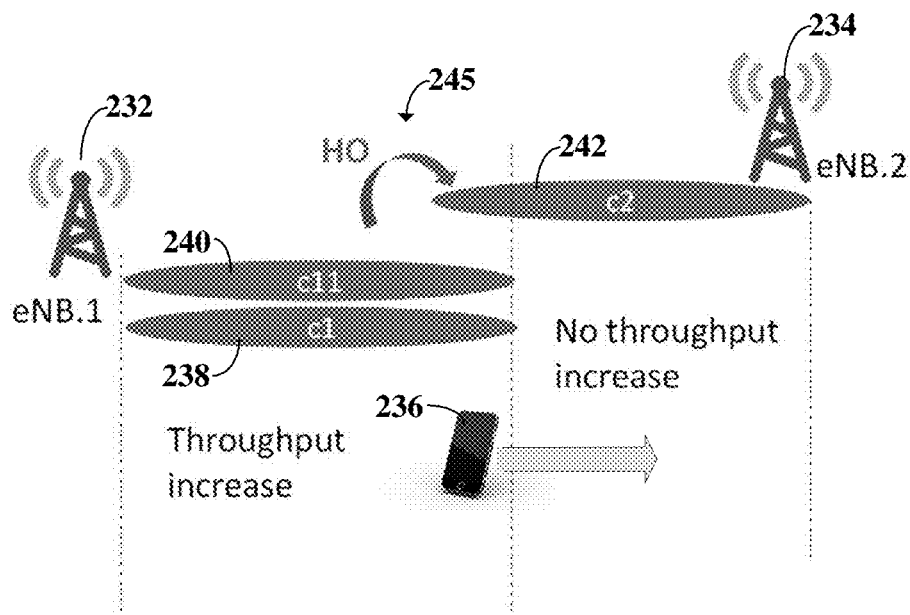
FIG. 2B depicts an illustrative embodiment of a radio communication network employing carrier aggregation in accordance with various aspects described herein.

FIG. 2B depicts an illustrative embodiment of a radio communication network 230 employing carrier aggregation in accordance with various aspects described herein. FIG. 2B illustrates a case where there are two collocated cells and carrier aggregation is available. The radio communication network 230 includes a first eNodeB 232 labelled eNB.1 in the drawing figure, and a second eNodeB 234 labelled eNB.2 in the drawing figure. The first eNodeB 232 and the second eNodeB 234 may be considered network nodes and provide communication access to other portions of a communication network including the radio communication network 230. A user equipment (UE) device 236 is moving from left to right as indicated by the arrow in the drawing figure. The UE device 236 moves from a coverage area of the first eNodeB 232 to a coverage area of the second eNodeB 234. The UE device 236 may be any suitable device configured for radio communication according to an air interface standard, such at LTE Advanced or 5G cellular.

The first eNodeB 232 includes collocated cells providing radio communication service to UE devices in a first coverage area 238, labelled c1 in the drawing figure, and radio communication service to UE devices in a second coverage area 240 labelled c11 in the drawing figure. In the drawing, the first coverage area 238 and the second coverage area 240 are generally coextensive but that is not necessary and may generally not be the case. However, the first coverage area 238 and the second coverage area generally overlap so that a UE device is generally simultaneously in both the first coverage area 238 and the second coverage area 240. The radio communication service provided to the first coverage area 238 and the second coverage area 240, may employ carrier signals that may be aggregated to increase throughput for the UE device 236. The carriers may be on different carrier frequencies and have other similar or different channel characteristics, but he UE device 236 can successfully receive both carriers.

In the example, the UE device 236 is initially attached to the first eNodeB 232 on a carrier serving first coverage area 238, labelled c1. The UE device 236 detects a second carrier from the first eNodeB 232 serving coverage area 240, labelled c11. The UE device 236 is capable of carrier aggregation and can support the carrier aggregation frequency combination. By means of the carrier signal for coverage area 238, c1, the first eNodeB 232 configures and activates coverage area 240, carrier c11, as an SCell. The UE device 236 now uses 2×2 carrier aggregation with carriers c1 and c11, in the first coverage area 238 and the second coverage area 240. Subsequently, the UE device 236 detects the second eNodeB 234 and third coverage area 242, carrier c2, and hands over to this cell.

By aggregating the carriers, the radio communication network 230 can use both carriers to communicating data on an uplink, downlink or both with the UE device 236, increasing throughput while the UE device is in the first coverage area 238 and the second coverage area 240.

The second eNodeB 234 provides radio communication service to a third coverage area 242, labelled c2 in the drawing figure. The second eNodeB 234 does not have a collocated cell, unlike the first eNodeB 232, so carrier aggregation is not possible with the second eNodeB 234. As indicated, there is an overlap region where the first coverage area 238 and the second coverage area 240 overlap with the third coverage area 242. As the UE device 236 moves from left to right, the UE device enters a handover region 245 where the UE device 236 is in radio communication with both the first eNodeB 232 and the second eNodeB 234. Once communication is handed off to the second eNodeB 234, the throughput increase provided by the collocated cells of the first eNodeB 232 is no longer possible. FIG. 2B is an example in which carrier aggregation is used by an operator of the radio communication network 230 to increase UE throughput. Carrier aggregation is usually configured with collocated cells operating in the same frequency band, which provide similar coverage for UE devices such as UE device 236.

Figure 2C:
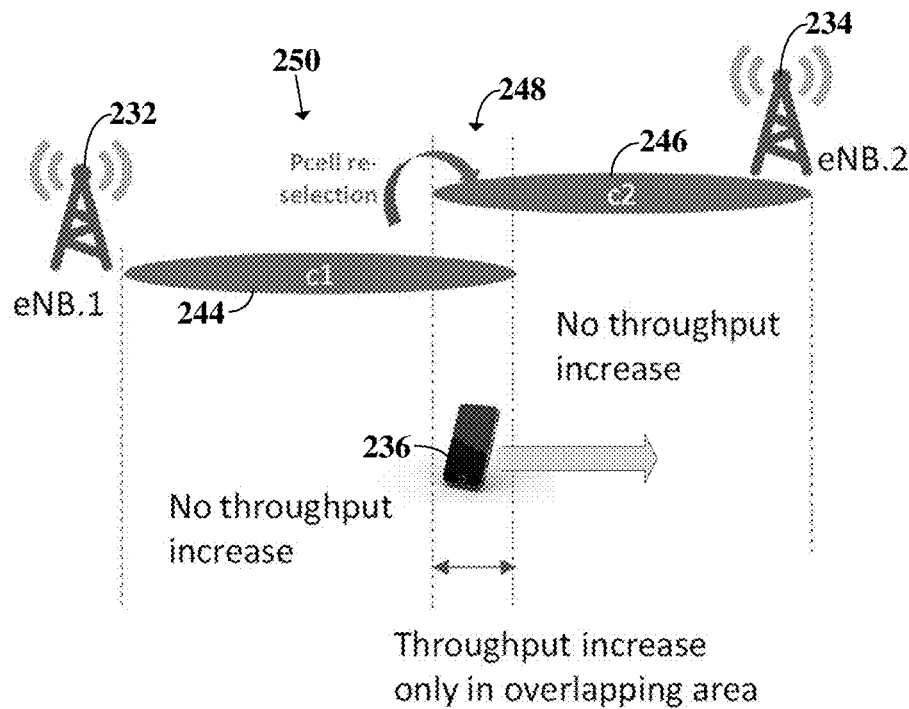
FIG. 2C depicts an illustrative embodiment of a radio communication network employing carrier aggregation in accordance with various aspects described herein.

FIG. 2C depicts an illustrative embodiment of a radio communication network 230 employing carrier aggregation in accordance with various aspects described herein. FIG. 2C shows an example of carrier aggregation with non-collocated cells. Similar to FIG. 2B, radio communication network 230 includes a first eNodeB 232 and a second eNodeB 234. The first eNodeB 232, labelled eNB.1 in the drawing figure, provides radio communication service to UE devices such as UE device 236 in a first coverage area 244, labelled c1 in the drawing figure. The second eNodeB 234 provides radio communication services to UE devices such as UE device 236 in a coverage area 246, labelled c2 in the drawing figure. Also similar to FIG. 2B, the UE device 236 moves from left to right in the drawing figure, as indicated by the arrow. Neither the first eNodeB 232 nor the second eNodeB 234 includes collocated cells. Therefore, carrier aggregation is not possible within either first coverage area 244 or the second coverage area 246.

As indicated in FIG. 2C, there is an overlap region 248 between the first coverage area 244 and the second coverage area 246. In the overlap region, radio communication service is available to UE devices such as the UE device 236 from both the first eNodeB 232 and the second eNodeB 234. The UE device 236 in the overlap region 248 can receive a carrier signal from both the first eNodeB 232 and the second eNodeB 234. In the overlap region 248, a throughput increase is available for the UE device 236. The UE device 236 can perform a Pcell re-selection process 250 and be in communication with the first eNodeB 232 and the second eNodeB 234. When communicating with both the first eNodeB 232 and the second eNodeB 234, the UE device 236 may cooperate with the radio communication network 230 by aggregating respective carriers from each respective cell, including the first eNodeB 232 and the second eNodeB 234. In the overlap region, the throughput for the UE device 236 may be a combination of throughput from the first eNodeB 232 and throughput from the second eNodeB 234.

In an example illustrating coverage extension, the UE device 236 is initially attached to the first eNodeB 232 in the first coverage area 244, labelled c1. The UE device 236 moves toward the second coverage area 246 and detects the second eNodeB 234, c2, while still connected to the first eNodeB 232. The UE device 236 is capable of carrier aggregation and supports carrier aggregation and frequency combination. The first eNodeB 232 configures and activates the second eNodeB 234 as an SCell. The UE device 236 now uses 2×2 carrier aggregation with the first eNodeB 232 and first coverage area 244, c1, along with the second eNodeB 234 in the second coverage area 246, c2. The carrier aggregation occurs on the in the overlap region 248. The first eNodeB 232 becomes the primary cell or PCell and the second eNodeB 234 becomes the secondary cell or SCell. As the UE device 236 moves deeper into the second coverage area 246 (moving from the left to the right in FIG. 2C), a PCell reselection process occurs. As a result, second eNodeB 234, or carrier c2, becomes the primary cell or PCell and the first eNodeB 232 becomes the secondary cell (SCell). Eventually, the UE device 236 moves out of the first coverage area 244, c1, and the second eNodeB 234 deactivates the first eNodeB as a secondary cell or SCell.

The example of FIG. 2C shows that carrier aggregation can also be configured on non-collocated cells with partial coverage overlap, such as in the overlap region 248. This technique is used to extend coverage. As the UE device 236 moves from first coverage area 244 to second coverage area 246, the UE device 236 may aggregate carriers from each respective cell. As the UE device 236 moves away from the first eNodeB 232, the signal will become weaker and the call may be dropped from first eNodeB 232. However, because the UE device 236 is also in communication with the second eNodeB 234 in the overlap region 248, the risk of completely dropping the call is reduced. This is a benefit of carrier aggregation in this example.

Mobility on a system using carrier aggregation to provide coverage extension, as illustrated in FIG. 2C, for example, relies on PCell re-selection. Mobility on a system using carrier aggregation to provide a throughput increase relies on a handover procedure. The handover procedure requires more UE battery resources and network signaling overhead than PCell re-selection. Moreover, using carrier aggregation to provide coverage extension may minimize likelihood of call-drop at cell edge, since RF resources are aggregated at the cell edge.

There may be cases in which using carrier aggregation to provide coverage extension is more useful for some UE devices than using carrier aggregation to provide a throughput increase. Possible examples include a mission-critical device with limited battery power, such as an internet of things (IoT) device or an unmanned aerial vehicle (UAV) that has high mobility and no need for higher throughput.

UE devices such as UE device 236 may be limited by the carrier aggregation frequency combination and the maximum number of Component Carriers (CCs) supported. For example, a UE device can support up to 2×2 carrier aggregation, therefore the UE device can either do carrier aggregation with {c1+c11} or carrier aggregation with {c1+c2}, using the notation of FIGS. 2B and 2C.

3GPP Standards do not offer recommendations for selecting and configuring carrier aggregation to increase throughput or to expand coverage based on UE device demand and requirements. Conventionally, the UE device measures relative signal strength for carriers received from, for example, first eNodeB 232 and second eNodeB 234. Based on signal strength at the UE device, a carrier aggregation mode will be selected, either carrier aggregation to provide coverage extension or carrier aggregation to provide a throughput increase. The UE device collects signal strength and other information and reports the collected information to the network. The network will decide which carrier aggregation scheme to use.

Figure 2D:
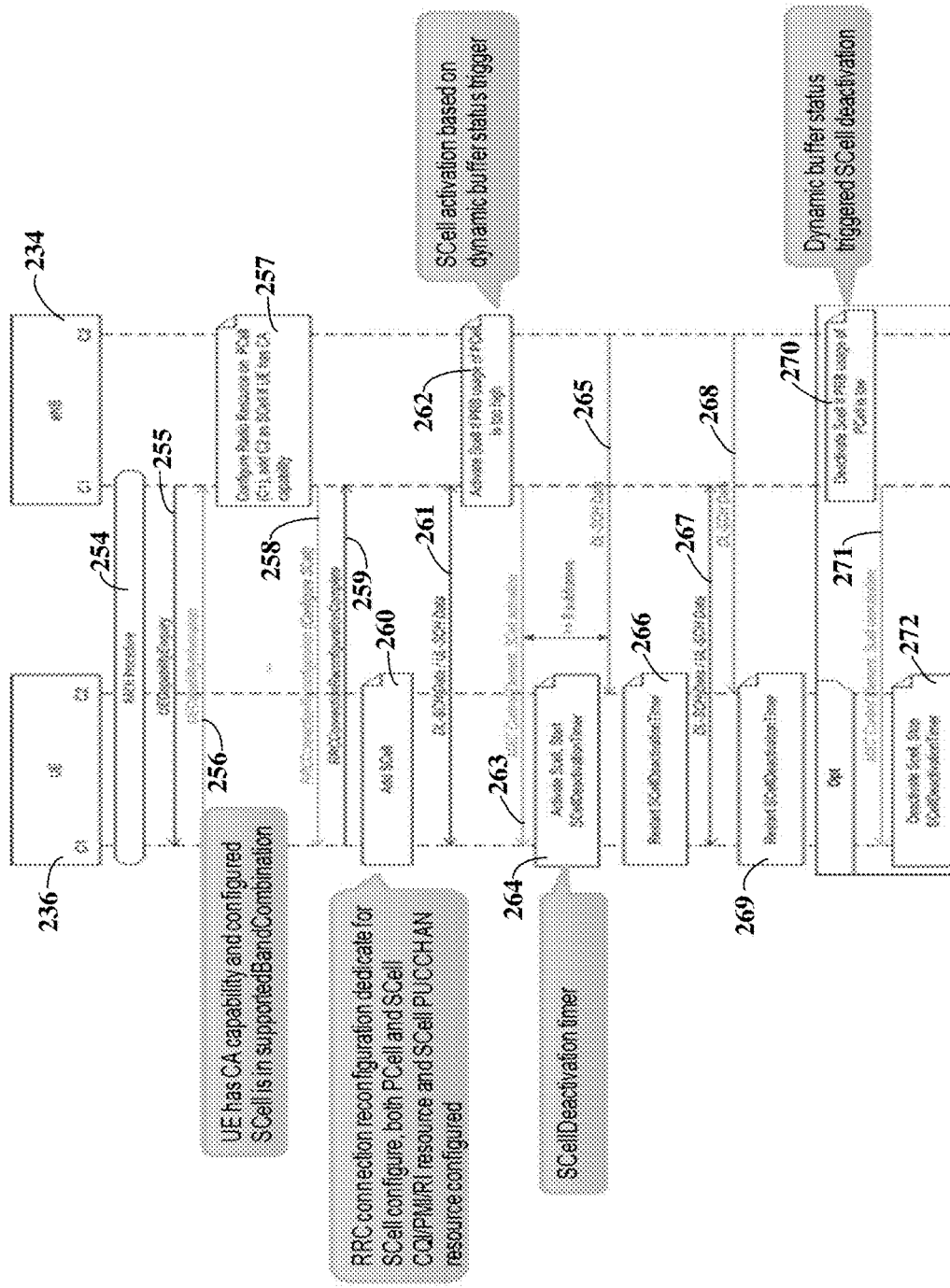
FIG. 2D depicts an illustrative embodiment of a method for carrier aggregation in a radio communication network in accordance with various aspects described herein.

FIG. 2D depicts an illustrative embodiment of a method 252 for carrier aggregation in a radio communication network in accordance with various aspects described herein. The method 252 includes communication between a UE device 236 and an eNodeB 234. The method 252 may be performed in accordance with a radio communication network such as the radio communication network 200 of FIG. 2A or radio communication network 230 of FIG. 2B and FIG. 2C. The radio communication network may be a radio access network that provides mobile radio communication services to user equipment devices such as UE device 236 using stationary equipment such as eNodeB 234. The radio communication network operates according to an air interface standard and may be, for example, an LTE Advanced network, a 5G cellular network, or any other suitable network known or developed. The eNodeB 234 may provide multiple carriers such as carrier C1 and C2 for communicating with the UE device 236 and other UE devices. The UE device 236 has capabilities to communicate using carriers C1 and C2 and may have other capabilities as well. Moreover, the eNodeB 234 may initiate carrier aggregation by assigning a primary cell (PCell) and one or more secondary cells (SCell) to communicate with the UE device.

The algorithm or method 252 may be performed at or located at any suitable location in the radio communication network. Similarly, some or all steps of the method 252 may be performed at any suitable location or by any suitable device in the radio communication network. In examples, the algorithm may be performed at a node of a core network such as core network 220 (FIG. 2A), at a self-organizing network control module such as the self-organizing network control module 224 (FIG. 2A), at a mobile edge compute control such as the mobile edge compute control 226 (FIG. 2A) or at a radio access network intelligent controller such as the RAN intelligent controller 218 (FIG. 2A). In some applications, the algorithm or method 252 may be located in the cloud, meaning that processing and storage facilities will be distributed across a plurality of devices which are in communication across a network and without regard to specific location of any particular aspect of the algorithm.

The method begins at step 254 where a procedure is conducted to initiate communication between the UE device 236 and the eNodeB 234. In the illustrated embodiment, the procedure is a remote access control channel (RACCH) procedure according to the air interface standard for the radio access network. The procedure of step 254 operates to establish a two-way radio link between the UE device 236 and the eNodeB 234. The procedure of step 254 may incorporate several steps and exchange of information.

At step 255, the eNodeB 234 transmits an enquiry about the capabilities of the UE device 236. This may be a standard request for the UE device 236 to provide a standard matrix of information defining UE device capabilities. In other embodiments, other enquiry formats may be used. In some embodiments, the request may specify information about a primary cell (PCell) and one or more secondary cells (SCell) that are configured to communicate with the UE device 236.

At step 256, the UE device 236 responds to the UE capability enquiry of step 255 by providing UE capability information and UE requirements information. As noted, the UE capability information may be presented in any suitable format, such as a standard matrix of information defining UE device capabilities. In particular, in accordance with current embodiments, the UE device 236 may indicate whether the UE device 236 has the capability for carrier aggregation and, if so, how many carriers may be aggregated. This information may be determined by, for example, hardware capabilities of the UE device 236, such as whether the UE device 236 can tune, demodulate and decode multiple carrier frequencies and formats. Further, the UE capability information may indicate whether the SCell identified by the eNodeB in step 255 is in a frequency band or combination of frequency bands supported by the UE device 236.

At step 257, responsive to the UE capability information and the UE requirements information received at step 256, the eNodeB 234 configures radio resources. In the example, the eNodeB 234 configures a radio resource on the primary cell (PCell) based on the information from the UE device 236. For example, the eNodeB may configure carrier C1 as the PCell. If the UE device 236 has indicated it has capability for carrier aggregation, the eNodeB 234 configures a secondary cell for carrier aggregation where possible. For example, the eNodeB 234 configures the carrier C1 as the SCell.

At step 258, the eNodeB 234 initiates a radio resource control (RRC) connection reconfiguration procedure. In the RRC connection reconfiguration procedure, the eNodeB 234 responds to the UE capability information received from the UE device 236 at step 256 by providing specific carrier aggregation for the particular UE device 236. Carrier frequencies are assigned and other necessary information is provided by the network, through the eNodeB 234, to the UE device 236. The information may be provided in an RRC Connection Reconfiguration message from the eNodeB 234 to the UE device 236.

At step 259, the UE device 236 confirms reception of the RRC connection reconfiguration information. At step 260, the UE device 236 adds the SCell which was configured by the eNodeB 234 at step 260. Also at step 260, the UE device 236 performs the RRC connection reconfiguration according to the instruction from the eNodeB 234 received at step 258. In embodiments, the UE device 236 configures the PCell and the SCell and configures the channel quality indicator (CQI), pre-coding matrix indicator (PMI) and rank indicator (RI). These values reflect the quality of the LTE access channel, or the accuracy of the transfer of bits in each direction over the wireless (RF) channel. Further, in the example, the SCell physical uplink control channel (PUCCH) is configured.

At step 261, normal data exchange occurs between the UE device 236 and the eNodeB 234. Data exchange is two-way, on the downlink and the uplink. In the example, a downlink shared channel (DL-SCH) is used to communicate downlink data. Similarly, on the uplink, an uplink shared channel (UL-SCH) is used to communicate uplink data. Data is exchanged using the primary cell or PCell, carrier C1. As data is exchanged, the data may be stored in a buffer and the amount of buffered data may be compared with a threshold. The data may be measured as a number of physical resource blocks (PRB) communicated between the UE device 236 and the eNodeB 234.

At step 270, carrier aggregation begins. In the example, the secondary cell (SCell) that was configured at step 257 is activated. In an example, if the amount of buffered data exceeds a threshold, the SCell is activated and a second carrier C2 associated with the second cell may begin communicating data. For example, if the UE device 236 is downloading a large file such as a video file, the eNodeB implementing the method 252 may determine that the file download may occur more efficiently if a second carrier is employed. In that case, the SCell is activated to provide the data to the UE device on carrier C2, along with the PCell and carrier C1. If the UE device 236 has capabilities for aggregating more than two carriers (referred to as 2×2 carrier aggregation), the eNodeB 234 may initiate more carriers such as 4×4 or 8×8 carrier aggregation. The details of the carrier aggregation are based in part on the requirements and capabilities of the UE device 236 reported at step 256.

At step 263, using the primary cell PCell and carrier C1, the eNodeB 234 signals to the UE device 236 that the SCell is being activated and to begin using the carrier C2 associated with the SCell. At step 264, the UE device 236 activates the SCell locally and prepares to begin carrier aggregation with both carrier C1 and carrier C2. In the example embodiment, the UE device 236 sets an SCell deactivation timer. This timer may be used to limit the time during which the SCell is activated for carrier aggregation with the UE device 236 so as to not tie up network resources needlessly. If the time expires without further data being communicated with the SCell, the SCell may be deactivated for the UE device 236 and used for other purposes.

At step 265, carrier C2 is used to communicate data from the eNodeB 234 to the UE device 236. In the example, the downlink shared channel (DL-SCH) is used to communicate downlink data on the SCell. At step 266, responsive to receiving the downlink data, the SCell deactivation timer is reset.

At step 267 and step 268, the eNodeB 234 and the UE device 236 operate in a carrier aggregation mode to convey data to the UE device 236. The operations of step 267 and step 268 generally operate simultaneously as the carriers are aggregated to provide either added throughput to the UE device 236 or to provide coverage extension for the UE device 236. At step 267, the downlink shared channel (DL-SCH) and the uplink shared channel (UL-SCH) of the PCell, carrier C1, are used for two way communication of data on the PCell. At step 268, the downlink shared channel (DL-SCH) of the SCell, carrier C2 is used to communicate downlink data from the eNodeB 234 to the UE device 236. At step 269, each time downlink data is received at the UE device 236, responsive to receiving the downlink data, the SCell deactivation timer is reset.

At step 270, if the need for carrier aggregation has ended, the eNodeB 234 may terminate the process. In the example, if the amount of buffered data falls below a threshold, the eNodeB 234 may deactivate the SCell. A message is communicated to the UE device 236, step 271, and at step 272, the SCell is deactivated at the UE device 236 and the SCell deactivation timer is deactivated.

Conventionally, a network has ability to aggregate carriers for a UE device. Carrier aggregation may be initiated by the network to increase throughput for the UE device. Or carrier aggregation may be initiated by the network to extend coverage for the UE device. However, the network, when initiating carrier aggregation, conventionally has limited information about the UE device. For example, the network may only have a report from the UE device that the UE device supports carrier aggregation and the number of carriers the UE device can aggregate. The network may not make the best decision for a particular UE device, given the current circumstances for that UE device and the circumstances for the network. For example, if the network initiates carrier aggregation to increase throughput to the particular UE device, but the UE device is currently engaged in a voice call but is at risk of dropping the call because of operation at a cell fringe area, the carrier aggregation may not actually help the operation of the UE device. Instead, the carrier aggregation in that circumstance may needlessly consume network resources (the reassigned carrier) and not address the current problem of the UE device with risk of dropped calls.

Figure 2E:
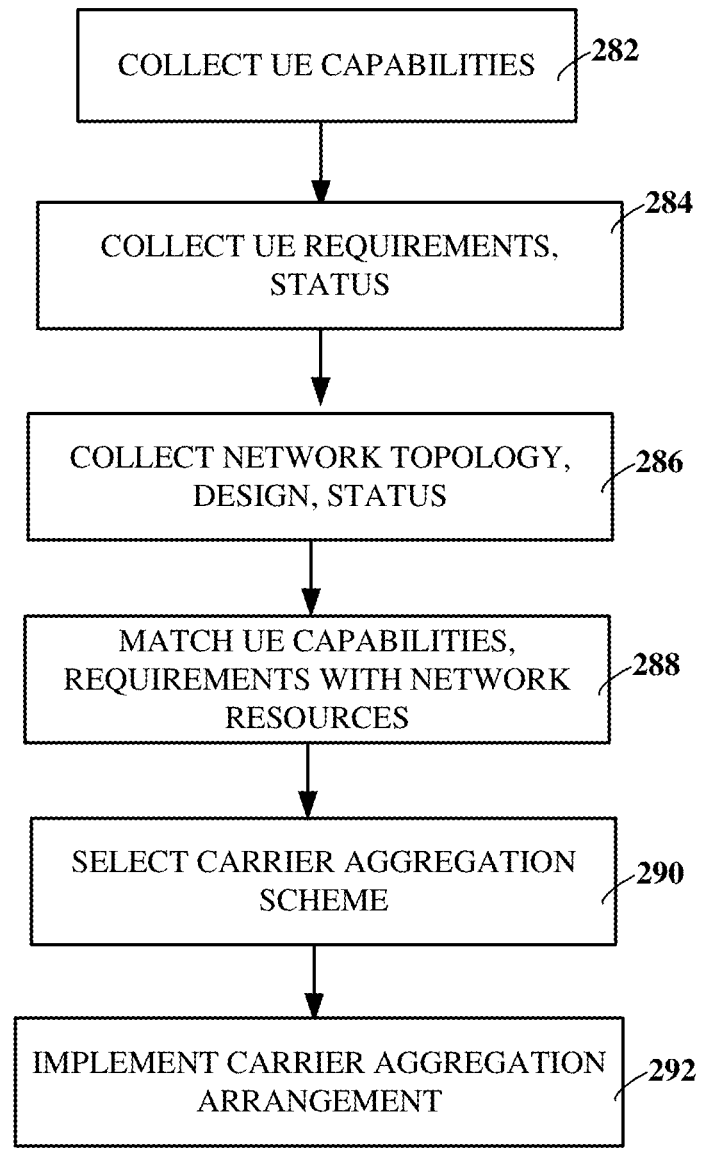
FIG. 2E depicts an illustrative embodiment of a method for selection and configuration of carrier aggregation based on user equipment demand and requirements in a radio communication network in accordance with various aspects described herein.

FIG. 2E depicts an illustrative embodiment of a method 280 for automatic selection and configuration of carrier aggregation based on user equipment demand and requirements in a radio communication network in accordance with various aspects described herein. The method 280 relates to communication between a UE device 236 and a first eNodeB 232 and a second eNodeB 234. The method 280 may be performed in accordance with a radio communication network such as the radio communication network 200 of FIG. 2A or radio communication network 230 of FIGS. 2B and 2C. The radio communication network may be a radio access network which provides mobile radio communication services to user equipment devices such as UE device 236 using stationary equipment such as eNodeB 234. The radio communication network operates according to an air interface standard and may be, for example, an LTE Advanced network, a 5G cellular network, or any other suitable network known or developed. The eNodeB 234 may provide multiple carriers for communicating with the UE device 236 and other UE devices, as described in connection with FIG. 2B and FIG. 2C. The UE device 236 has capabilities to communicate using carriers and may have other capabilities as well. Moreover, the eNodeB 234 may initiate carrier aggregation by assigning a primary cell (PCell) and one or more secondary cells (SCell) to communicate with the UE device.

The algorithm or method 280 may be located at any suitable location in the radio communication network. Similarly, some or all steps of the method 280 may be performed at any suitable location or by any suitable device in the radio communication network. In examples, the algorithm may be performed at a node of a core network such as core network 220 (FIG. 2A), at a self-organizing network control module such as the self-organizing network control module 224 (FIG. 2A), at a mobile edge compute control such as the mobile edge compute control 226 (FIG. 2A) or at a radio access network intelligent controller such as the RAN intelligent controller 218 (FIG. 2A). In some applications, the algorithm or method 280 may be located in the cloud, meaning that processing and storage facilities will be distributed across a plurality of devices which are in communication across a network and without regard to specific location of any particular aspect of the algorithm.

In accordance with embodiments, carrier aggregation can be configured for a particular UE device to increase throughput for the UE device or to extend coverage for the UE device. Throughput refers to the actual amount of data or information that is successfully communicated over a communication link, such as between a UE device and the network or a component of the network such as a base station or eNodeB. Throughput may be measured in Mbps or similar units. Coverage extension refers to an increase in the geographical area to which a base station provides radio communication services.

The selection of carrier aggregation to increase throughput or to extend coverage is done in a UE-basis and may be based on UE demand and requirements. The method 280 implements an algorithm which includes dynamically collecting UE device capabilities and requirements and collecting network information to decide which type of carrier aggregation is to be used for a particular UE device at a given time. The method may use collocated cells or non-collocated cells to provide the increase in throughput or the coverage extension.

The method begins at step 282 where the method includes collecting information about capabilities of a particular user equipment (UE) device. The UE device may be any suitable device operating in a radio communication network such as a mobile station (MS), portable part (PP), cellular telephone or other device equipped with a cellular transceiver for radio communication with network nodes of a radio access network. The UE device may operate according to an air interface standard such as LTE, LTE Advanced, 5G cellular or any other mobile communications standard.

Collecting information about the UE device capabilities may be performed in any suitable way. In an example, when the UE device is powered on, the UE device enters a network initialization procedure in which the UE device begins communicating on designated channels of the network. For example, the UE device may be in an area served by a first eNodeB. The UE device may begin communicating with the first eNodeB according to procedures of the controlling air interface standard. In another example, the UE device is active on the network and is communicating with multiple cells in the area. The UE device may enter a cell reselection process to change its primary serving cell from one eNodeB or one carrier to another, new cell. Upon executing the cell reselection process, the UE device will communicate information about device capabilities to the new cell. In another example, the UE device may hand over communication from a first eNodeB to a second eNodeB as the UE device moves through the region. As part of the handover process, the UE device reports its capabilities according to procedures of the controlling air interface standard.

Such procedures may include identifying the UE device and providing information about the capabilities of the UE device such as in a standard matrix of information. In particular, the UE device may report carrier frequencies or frequency bands on which the UE device can operate. Such frequency capabilities may be set by the particular hardware of the UE device, including particular radio features such as a tuner, filters and other devices. In other embodiments, the frequency capabilities may be set by a rate plan maintained by the owner of the UE device with an operator of a communications network, including roaming arrangements. The UE device may report its ability to aggregate carriers communicated by the eNodeB or by a group of eNodeB devices. The UE device may report a maximum number of carrier components that the UE device can support for carrier aggregation purposes, such as 2×2 carrier aggregation, 4×4 carrier aggregation, and others. The UE device may report particular combinations of carrier aggregation frequencies that it is capable of using in a carrier aggregation mode of operation.

In another example, the UE device may report its capabilities in response to a particular carrier aggregation inquiry directed to the UE device. For example, an algorithm may be monitoring UE devices operational on a radio network and identifying possible applications of carrier aggregation. The algorithm may respond to relative traffic levels or any other input. For example, if traffic volume is relatively low and the network has available resources to share with a single UE device, such as multiple available carriers, the algorithm may search for UE devices as carrier aggregation candidates. The search may include specifically requesting one or more UE devices to report carrier capabilities for evaluation as a carrier aggregation candidate.

At step 284, the method 280 includes collecting information about requirements and status of the UE device. Such requirements and status information may include information about, for example, the current battery level of the UE device, meaning the relative amount of energy stored in a batter which powers the device. The UE device may, for example, report its battery is near-full, at 50 percent, or critically low. Such requirements and status information may further include identification of the eNodeB devices the UE device can detect, including information about carrier frequencies detected and a relative signal strength for each carrier from each eNodeB.

Such requirements and status information may further include a current operating mode of the UE device. In one example, the UE device has an operating mode of engagement in a voice call and therefore has a requirement that the call not be dropped or unexpectedly terminated. In a second example, the operating mode of the UE device may include downloading a large data file and therefore a requirement for rapid, efficient transfer of data packets from the network over a radio channel to the UE device. In a third example, the operating mode of the UE device may include a mobility mode in which the UE device is physically moving, and the information about requirements and status may include an estimated direction and speed of movement. For example, the UE device may report that it is moving at a specified velocity away from a first eNodeB and toward a second eNodeB, specifying identification information for the respective eNodeB devices.

The process of step 284, of collecting information about requirements and status of the UE device, may be done by accessing existing information of the radio access network. For example, the UE device may have separately reported its battery status to the serving eNodeB and that information may be stored at a suitable network location, such as the Radio Access Network intelligent controller 218 (FIG. 2A). Information about activity or device status in the network, such as a current voice call or current or scheduled data transfer, may be retrieved from storage at other network sources as well. In an alternative example, the algorithm of method 280 may specifically request the desired information, such as by communicating a message to a network node or to the UE device. The message may be a standardized message or may be customized to the specific requirement.

As noted, the method 280 may be performed at a node of a core network such as core network 220 (FIG. 2A), at a self-organizing network control module such as the self-organizing network control module 224 (FIG. 2A), at a mobile edge compute control such as the mobile edge compute control 226 (FIG. 2A) or at a radio access network intelligent controller such as the RAN intelligent controller 218 (FIG. 2A). Thus, the information collected in step 282 and step 284 may be collected at the device where the method 280 is being performed. Any suitable technique or format for communicating the information may be used including specific messaging to other network elements to request the desired information and accessing, by the method 280, stored data such as operational data in one more networked databases.

At step 286, the method 280 includes collecting information about network topology, network design and network status. Information about network topology may include information defining location and capabilities of network nodes, including those network nodes with which the UE device is in communication or likely to communicate with. For example, if the UE device reports at step 284 being actively engaged in a voice call through a first eNodeB on a carrier C1, step 286 may include collecting information about neighboring eNodeB devices in the vicinity of the first eNodeB which may be handoff candidates for the UE device. Such information may further include details about carrier availability of those neighboring eNodeB devices.

At step 286, information about network design may include information about particular network nodes and capabilities. For example, if the UE device reports that the UE device detects a particular carrier from a particular cell, step 286 may include determining the capabilities for that particular cell, such as carriers supported by the particular cell or information about the equipment forming the cell. If the cell includes a low-capability or old model base station, that information may be useful in selecting a carrier aggregation scheme.

At step 286, information about network status may include information about relative traffic levels in portions of the network. This may include information about available capacity to handle additional traffic on a particular carrier by a particular eNodeB. This may include information about current dynamic activity in the network, such as active voice calls predicted to be handed off to the particular eNodeB. This may include historical information, such as relative traffic levels on the particular eNodeB at particular days of the week and times of the day. Information about network status may further include information about operational status of network elements. Such operational status may include information such as fully operational, down for maintenance, or other current availability information. Such information may be useful in selecting a carrier aggregation scheme for the UE device.

At step 288, the method 280 includes matching the UE capabilities collected at step 282 and UE requirements collected at step 284 with network design, topology and status information collected at step 286. The algorithm matches network resources with the UE device to select a carrier aggregation arrangement for the UE device. The result of the match is carrier aggregation option information. The carrier aggregation option information includes possible network nodes, eNodeB devices, carriers and other network facilities which may be available and designated for carrier aggregation. Further the carrier aggregation option information includes network facilities that are suitable for carrier aggregation for the UE device given the current status of the UE device, the current status of the network nodes, the capabilities and the requirements of the UE device and the network topology of the radio communication network.

The nature of the matching at step 288 depends on the nature of the information collected at step 282, step 284 and step 286. For example, if the UE device reports a low battery condition, the network may locate base stations positioned for carrier aggregation between two adjacent base stations. Similarly, if the UE is engaged in a large download of data on an already-assigned carrier, step 288 may include locating an available cell with a carrier that can be aggregated with the already-assigned carrier to provide the data download more efficiently. If no suitable cell carrier is available, method 280 may not be able to match the UE capabilities with network resources.

At step 290, the algorithm includes implementing a carrier aggregation arrangement for the particular UE device. Carrier aggregation can be configured to increase throughput for the UE device or to expand coverage for the use device. The selection is done in an individual UE basis and is based on UE demand and requirements.

At step 292, the carrier aggregation scheme selected in step 290 is implemented. Implementation may be performed in any suitable manner. In an example, the method 252 of FIG. 2D or a variation thereof could be initiated to implement the selected carrier aggregation scheme.

In some embodiments, the selection of a carrier aggregation scheme at step 290 may be updated as circumstances change. For example, initially it may be appropriate to aggregate carriers to maximize throughput while a large data download is underway at the UE device. Once the download ends, however, to free up network resources, the carrier aggregation may be terminated and the added carrier reassigned in the network. In another example, if network traffic increases, the network may conclude that carrier aggregation is not currently permitted and the aggregated resources must be reassigned to support other traffic. Thus, in FIG. 2E, the method 280 may include testing of some conditions, such as against thresholds, as well as some looping among the steps of the method as circumstances of the UE device and the network change over time.

Embodiments in accordance with various aspects described herein provide substantial advantages. By choosing the correct carrier aggregation scheme for a given UE device based on its UE demand and requirements, embodiments increase throughput for the UE device, save UE device battery life, reduce network signaling overhead, and reduce likelihood of call-drop.

A series of examples may illustrate operation of the method and benefits obtained therefrom. The examples may be described in relation to FIG. 2B and FIG. 2C. In a first example, illustrated by FIG. 2B in which cell c1 is collocated with cell c11, the UE device reports to the network that it is capable of 2×2 carrier aggregation and is currently attached to cell c1. The UE device is moving toward cell c2. Cell c2 is adjacent to cell c1, meaning cell c2 serves a geographic area different from but in part overlapping the geographic area served by c1. The UE device reports to the network that its remaining battery power is low. The UE device is engaged in a voice call. The method 280 determines, based on the capabilities and requirements of the UE device, that the UE device does not need increased throughput. In this example, the network element implementing method 280 can either choose carrier aggregation between the combination of cell c1 and cell c11 (cell.1+cell.11) or carrier aggregation between cell c1 and cell c2 (cell.1+cell.2). Here, the method chooses carrier aggregation between cell c1 and cell c2 (cell.1+cell.2) for this UE device. This carrier aggregation arrangement provides coverage extension and can preserve battery life for the UE device.

In a second example also illustrated by FIG. 2B, the UE device reports it is capable of 2×2 carrier aggregation. The UE device is currently attached to cell c1 and is moving towards cell c2. Cell c11 is collocated to cell c1. Cell c2 is adjacent to cell c1. UE device reports that it has sufficient battery power. In this example, the UE device is engaged in a large data download. The method 280 determines that the UE device needs higher throughput to handle the data download rapidly and efficiently. The method 280 can either choose carrier aggregation between cell c1 and cell c11 (cell.1+cell.11) or carrier aggregation between cell c1 and cell c2 (cell.1+cell.2). In this example, the network device implementing method 280 chooses carrier aggregation between cell c1 and collocated cell c11 (cell.1+cell.11) for this UE device. The choice is based on a goal of increasing throughput.

In a third example, the UE device reports that it is capable of 2×2 carrier aggregation. The UE device is initially attached to cell c1. Cell c11 is collocated to cell c1. Cell c2 is adjacent to cell c1. The UE device is moving towards cell c2. The UE device reports that it has adequate battery power. The UE device is currently engaged in large data download and also currently engaged in a voice call. The method 280 determines that the UE needs higher throughput to handle the data download but the UE device also needs to avoid dropping the call. The network can either choose carrier aggregation between cell c1 and cell c11 (cell.1+cell.11) or carrier aggregation between cell c1 and cell c2 (cell.1+cell.2). In this example, the network device implementing method 280 chooses carrier aggregation between collocated cell c1 and cell c11 (cell.1+cell.11). This choice is based on a goal of increasing throughput to the UE device. However, as soon the UE device reports that it detects cell c2, then the network switches to carrier aggregation between cell c1 and cell c2 (cell.1+cell.2). In this example, carrier aggregation enables coverage extension and low likelihood of call-drop when the UE device is engaged in a voice call.

In a fourth example, a large number of UE devices active on the network report that they are capable of 2×2 carrier aggregation. The UE devices are currently attached to cell c1. Cell c11 is collocated to cell c1. Cell c2 is adjacent to cell c1. The UE devices are moving in and out of the coverage area of cell c2, in a ping-pong situation over time. This results in a large amount of handover network signaling overhead. The network device implementing method 280 can either choose carrier aggregation between cell c1 and cell c11 (cell.1+cell.11) or carrier aggregation between cell c1 and cell c2 (cell.1+cell.2). In this example, the method 280 selects carrier aggregation between cell c1 and cell c2 (cell.1+cell.2) for all the UE devices. This selection provides for coverage extension for the UE devices and reduces signaling overhead.

While for purposes of simplicity of explanation, the respective processes are shown and described as a series of blocks in FIG. 2D and FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of communication network 200, and method 252 presented in FIGS. 1, 2A, 2B, 2C, 2D, 2E and 3. For example, virtualized communication network 300 can facilitate in whole or in part collecting information about capabilities and requirements of a user equipment device on a mobility network, collecting network information, and selecting and configuring carrier aggregation based on the capabilities and requirements of the user equipment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
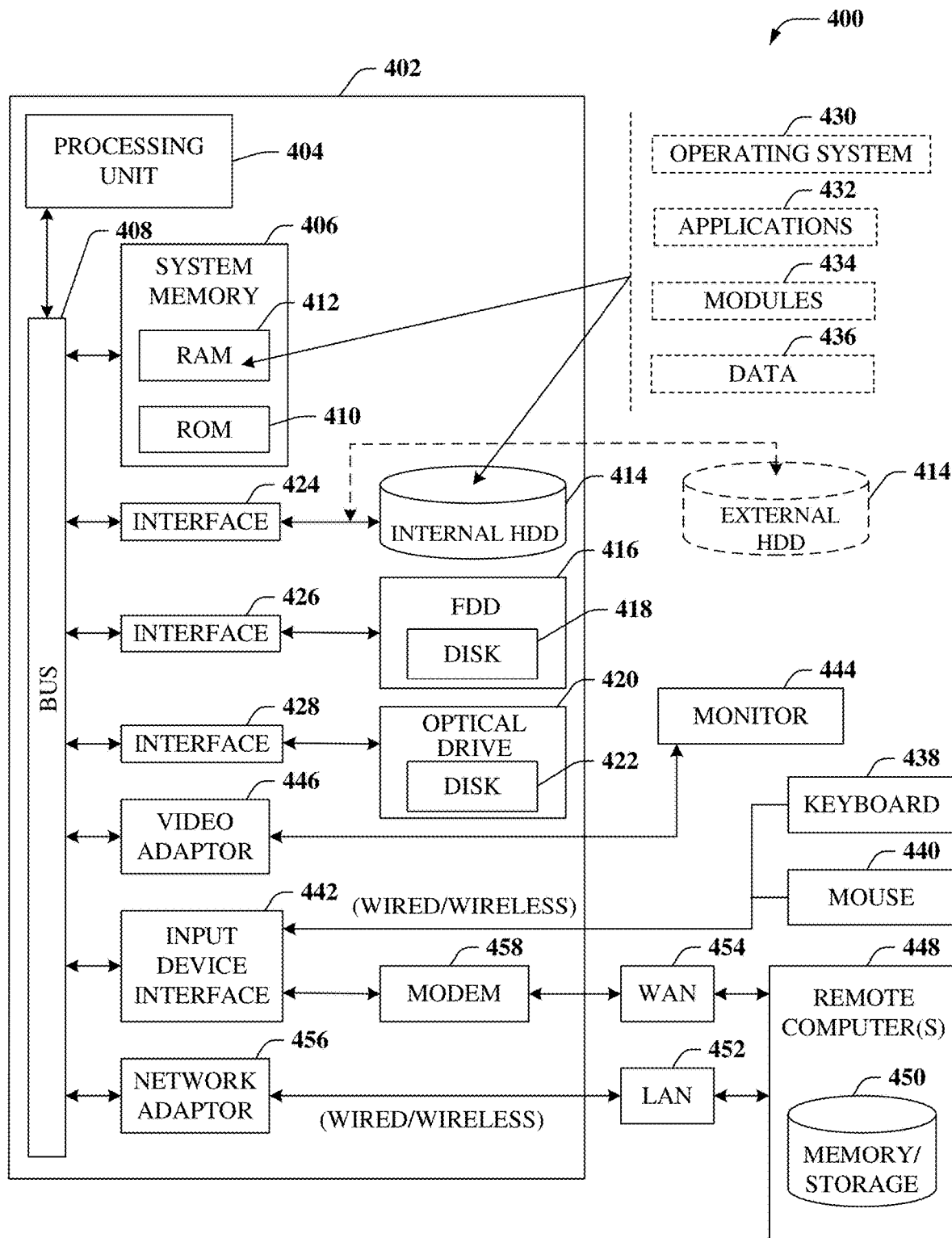
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting information about capabilities and requirements of a user equipment device on a mobility network, collecting network information, and selecting and configuring carrier aggregation based on the capabilities and requirements of the user equipment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
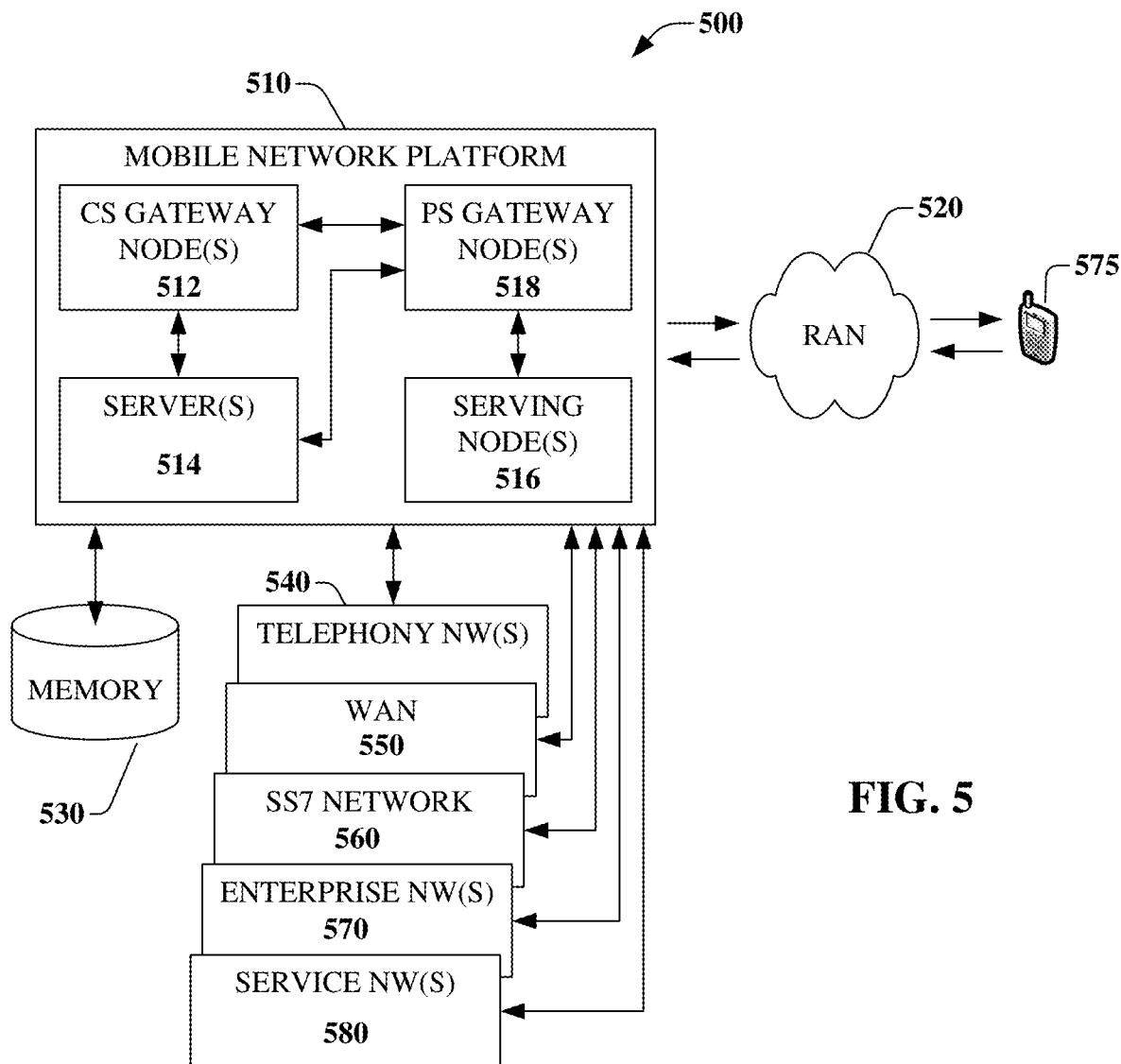
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting information about capabilities and requirements of a user equipment device on a mobility network, collecting network information, and selecting and configuring carrier aggregation based on the capabilities and requirements of the user equipment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
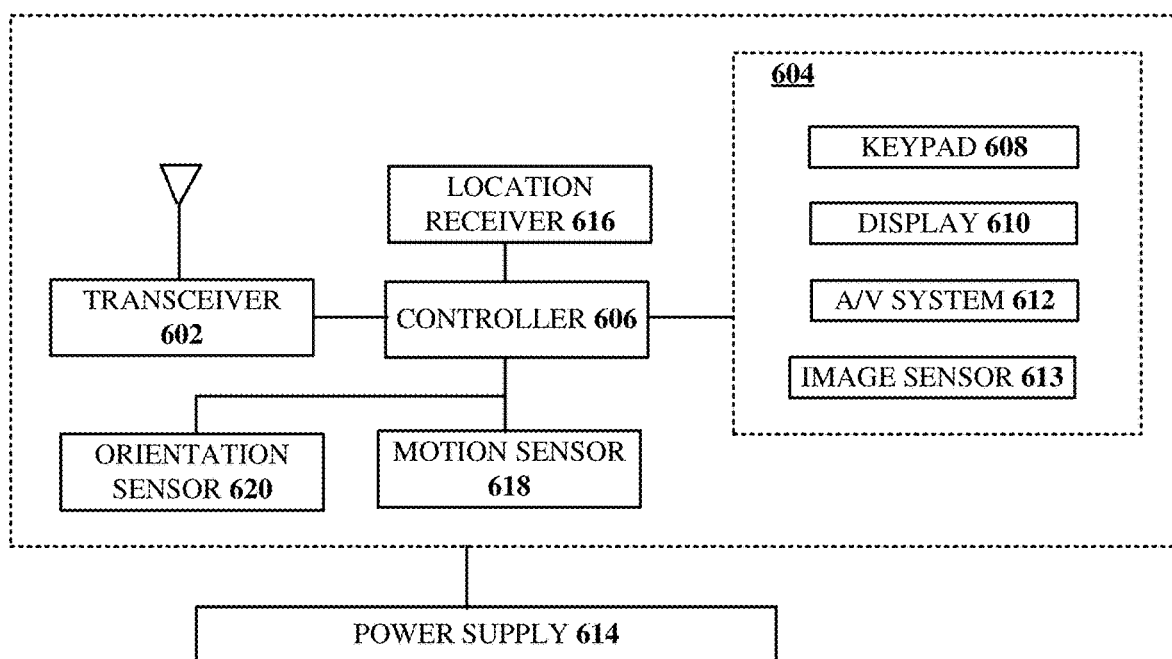
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part collecting information about capabilities and requirements of a user equipment device on a mobility network, collecting network information, and selecting and configuring carrier aggregation based on the capabilities and requirements of the user equipment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   collecting first information about capabilities of a user equipment (UE) device operating on a radio communication network;
   collecting second information about requirements and status of the UE device;
   collecting network topology information about the radio communication network;
   matching the first information and the second information with the network topology information to produce aggregation option information;
   selecting a carrier aggregation arrangement for the UE device based on at least the aggregation option information, resulting in a selected carrier aggregation arrangement,
   wherein the selecting the carrier aggregation arrangement for the UE device comprises
   identifying a first network node having a first coverage area and identifying a non-collocated second network node having a second coverage area adjacent to the first coverage area and accessible by the UE device,
   designating respectively the first network node and the second network node as a primary cell (PCell) and a secondary cell (SCell) for carrier aggregation when the UE device is in the first coverage area, and
   redesignating respectively the second network node as the PCell and the first network node as the SCell for carrier aggregation when the UE device is in the second coverage area; and
   configuring network nodes, including the first network node and the second network node, of the radio communication network according to the selected carrier aggregation arrangement.

2. The device of claim 1, wherein the collecting second information comprises determining an operating mode of the UE device and wherein the selecting a carrier aggregation arrangement for the UE device is based on the operating mode of the UE device.

3. The device of claim 2, wherein the determining the operating mode of the UE device comprises determining applications with which the UE device is currently engaged and requirements of the applications.

4. The device of claim 3, wherein the operations further comprise initiating carrier aggregation between the UE device and the primary cell and a collocated secondary cell.

5. The device of claim 3, wherein the operations further comprise initiating carrier aggregation between the UE device and the primary cell and the secondary cell.

6. The device of claim 1, wherein the collecting first information comprises collecting information defining location and capabilities of network nodes of the radio communication network, including network nodes with which the UE device is in communication and network nodes with which the UE device is likely to communicate.

7. The device of claim 4, wherein the initiating carrier aggregation is responsive to determining the UE device is engaged in receiving and/or transmitting data.

8. The device of claim 1, wherein the operations further comprise:
   communicating a query from a network device to the UE device; and
   receiving the second information in response to the query.

9. The device of claim 1, wherein the collecting first information comprises receiving information about carrier frequencies or frequency bands on which the UE device can operate.

10. The device of claim 1, wherein the collecting second information comprises receiving information about a current battery level of the UE device.

11. A non-transitory machine-readable medium, comprising executable instructions that, when executed by a processing system including a processor, facilitate performance of operations, the operations comprising:
    receiving, from a user equipment (UE) device, first information about capabilities of the UE device operating on a radio communication network, wherein the receiving comprises receiving information about carrier components supported by the UE device for carrier aggregation;
    receiving second information about current requirements and information about a current operational status of the UE device;
    selecting a carrier aggregation arrangement, wherein the selecting is based on the first information and the second information; and
    configuring a plurality of network nodes of the radio communication network according to the selected carrier aggregation arrangement to initiate carrier aggregation between the radio communication network and the UE device, wherein the configuring the plurality of network nodes comprises designating a first cell having a first coverage area as a primary cell (PCell) and a non-collocated second cell having a second coverage area adjacent to the first coverage area as a secondary cell (SCell) for carrier aggregation when the UE device is in the first coverage area, the configuring the plurality of network nodes further comprising re-designating the second cell as the PCell and the first cell as the SCell for carrier aggregation when the UE device is in the second coverage area.

12. The non-transitory machine-readable medium of claim 11, wherein the configuring a plurality of network nodes comprises:
    configuring the first cell as a primary cell for a plurality of UE devices including the UE device and configuring the second cell as a secondary cell for carrier aggregation to extend coverage for the plurality of UE devices including the UE device to reduce handover signaling overhead.

13. The non-transitory machine-readable medium of claim 12, wherein the configuring a plurality of network nodes comprises:
configuring a first cell with a non-collocated second cell for carrier aggregation to improve link reliability by minimizing a likelihood of call-drop at cell edge while reducing battery consumption of the UE device.

14. The non-transitory machine-readable medium of claim 13, further comprising:
configuring a first cell with a collocated second cell for carrier aggregation to increase data throughput to the UE device by increasing a combined amount of radio frequency (RF) resources from both the first cell and the collocated second cell.

15. The non-transitory machine-readable medium of claim 11, wherein the operations further comprise:
collecting information defining location and capabilities of network nodes of the radio communication network, including network nodes with which the UE device is currently in communication and network nodes with which the UE device is likely to communicate; and
selecting a carrier aggregation arrangement based on the information defining location and capabilities of network nodes.

16. The non-transitory machine-readable medium of claim 11, wherein the operations further comprise receiving information defining an operating mode of the UE device and wherein the selecting a carrier aggregation arrangement for the UE device is based on the operating mode of the UE device.

17. A method, comprising:
receiving, by a processing system including a processor, capabilities information of a user equipment (UE) device operating on a radio communication network;
receiving, by the processing system, requirements information of the UE device;
receiving, by the processing system, network topology information about devices of the radio communication network;
matching, by the processing system, the capabilities information and the requirements information with the network topology information, producing aggregation option information;
selecting, by the processing system, a carrier aggregation arrangement for the UE device based on at least the aggregation option information, wherein the selecting the carrier aggregation arrangement comprises
identifying a first network node serving a first coverage area including the UE device,
identifying a non-collocated second network node serving a second coverage area adjacent to the first coverage area and accessible by the UE device,
designating the first network node as a primary cell (PCell) and the second network node as a secondary cell (SCell) for carrier aggregation when the UE device is in the first coverage area, and
redesignating the second network node as the PCell and the first network node as the SCell for carrier aggregation when the UE device is in the second coverage area; and
configuring a plurality of network nodes including the first network node and the second network node of the radio communication network according to the carrier aggregation arrangement.

18. The method of claim 17, wherein the selecting a carrier aggregation arrangement comprises:
designating, by the processing system, the first network node for data communication with the UE device;
designating, by the processing system, the second network node for data communication with the UE device to improve data throughput to the UE device to satisfy UE device application requirements; and
initiating, by the processing system, data transmission to the UE device by both the first network node and the second network node.

19. The method of claim 17, comprising:
configuring, by the processing system, the first network node and the second network node for carrier aggregation to extend a coverage area including the UE device from the first coverage area to the second coverage area to satisfy UE device application requirements.

20. The method of claim 17, comprising:
receiving, by the processing system, information about carrier frequencies or frequency bands on which the UE device can operate; and
receiving, by the processing system, information about a current battery level of the UE device.

* * * * *